United States Patent
Venkatachalam et al.

(10) Patent No.: US 12,428,263 B2
(45) Date of Patent: Sep. 30, 2025

(54) INTELLIGENT ELEVATOR CONTROL SYSTEM UTILIZING WIRELESS USER LOCATION AWARENESS

(71) Applicant: Hewlett Packard Enterprise Development LP, Houston, TX (US)

(72) Inventors: Anandhakumar Venkatachalam, Bangalore (IN); Sasindran Devaraj, Bangalore (IN); Pavithra Kumar Bandi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1258 days.

(21) Appl. No.: 17/180,929

(22) Filed: Feb. 22, 2021

(65) Prior Publication Data
US 2021/0269280 A1    Sep. 2, 2021

(51) Int. Cl.
| | |
|---|---|
| B66B 1/46 | (2006.01) |
| B66B 1/28 | (2006.01) |
| B66B 1/34 | (2006.01) |
| B66B 5/00 | (2006.01) |
| B66B 5/02 | (2006.01) |
| G05B 15/02 | (2006.01) |
| H04W 4/029 | (2018.01) |
| H04W 12/06 | (2021.01) |

(52) U.S. Cl.
CPC ............... *B66B 1/468* (2013.01); *B66B 1/28* (2013.01); *B66B 1/3461* (2013.01); *B66B 5/0012* (2013.01); *B66B 5/02* (2013.01); *B66B 5/021* (2013.01); *G05B 15/02* (2013.01); *H04W 4/029* (2018.02); *H04W 12/06* (2013.01); *B66B 2201/103* (2013.01); *B66B 2201/4615* (2013.01); *B66B 2201/4638* (2013.01); *B66B 2201/4653* (2013.01); *B66B 2201/4676* (2013.01)

(58) Field of Classification Search
CPC ......... B66B 1/468; B66B 1/3461; B66B 1/28; B66B 5/0012; B66B 5/02; B66B 5/021; B66B 2201/103; B66B 2201/4615; B66B 2201/4638; B66B 2201/4653; B66B 2201/4676; H04W 4/029; H04W 12/06; G05B 12/02
See application file for complete search history.

(56) References Cited

U.S. PATENT DOCUMENTS

| | | | |
|---|---|---|---|
| 2011/0031070 A1* | 2/2011 | Gerstenkorn | B66B 1/468 187/382 |
| 2018/0201474 A1* | 7/2018 | Noxon | H04W 8/005 |
| 2019/0152741 A1* | 5/2019 | Wedzikowski | H04W 4/33 |

* cited by examiner

*Primary Examiner* — Loren C Edwards
(74) *Attorney, Agent, or Firm* — Hewlett Packard Enterprise Patent Department (57) ABSTRACT

Embodiments are directed to an intelligent elevator control system utilizing wireless user location awareness. An embodiment of non-transitory computer-readable storage mediums includes instructions for detecting a mobile device of a user at a first wireless access point for an elevator system; requesting authentication of the user for use of the elevator system from an authentication server; upon receiving authentication for the user from the authentication server, the authentication identification of a first authorized destinations for the user, calling, by an elevator control, a first elevator for the user; and directing the first elevator to the first authorized destination.

18 Claims, 8 Drawing Sheets

INTELLIGENT ELEVATOR CONTROL SYSTEM UTILIZING WIRELESS USER LOCATION AWARENESS

BACKGROUND

Elevator systems are utilized in many different environments, and in certain of these environments users have restricted access. For example, a particular user may be authorized to access certain floors in a certain complex, but the user may be prohibited or discouraged from accessing other portions of the complex. Further, other users may not be authorized to access the complex, and thus should not be utilizing the elevator system within the complex.

Conventional elevator technology may limit a user's access through issuance of a key card, with a card reader allowing card holders to access an elevator, or to access certain restricted floors. In other conventional systems, an assistant or operator may control elevator operation, and may call an elevator for a certain individual.

However, conventional elevator systems have limited capabilities, and do not provide intelligent access control for users. Further, a conventional elevator system requires significant overhead in controlling users, requiring personnel to either issue and maintain key cards, or to provide physical guarding of elevator entrances to ensure that only authorized persons can access the elevator or specified floors served by the elevator.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to an intelligent elevator control system utilizing wireless user location awareness.

In some embodiments, a system or process is to provide for intelligent elevator operation utilizing wireless awareness of users to transport a person utilizing an elevator to an authorized location within a building or complex with improved efficiency, user experience, and security.

While the discussion herein generally describes an elevator system delivering persons to various floors in a vertical operation, embodiments are not limited to this structure. Embodiments may also be implemented in other people moving systems allowing controlled entry and access, including certain types of rail vehicles and autonomous vehicles.

In some embodiments, an authentication server is to receive data regarding a user to request access to an environment, such as building or complex, that includes an elevator system that may be utilized for transport to multiple locations in the building or complex. The building or complex may include any facility that includes multiple floors or destinations, including, for example, an office building, a government facility, a hotel or resort complex, or a hospital or other medical facility. The locations in the building or complex may be commonly be multiple different floors that are served by the elevator system. For example, an administrator or other representative may input floor access information (or more generally, authorized destination information) for a user to an authentication server. In some embodiments, a mobile device of the user is provided with an identification key, such as an encrypted key, to enable the mobile device to act as a secure authentication for the user.

In some embodiments, an entrance access point (AP) is to detect the mobile device of a user upon the user reaching an entrance area for an elevator system of a building or complex, the entrance AP to obtain the identification key from the mobile device and communicate the identification to the authentication server to request authentication of the user. In some embodiments, the entrance AP is to communicate with the mobile device of the user using Bluetooth® Low Energy (BLE) communications. In some embodiments, the entrance AP may communicate with the mobile device using an alternative communication protocol, such as Wi-Fi.

The authentication server is to return approval or disapproval of the authentication request for a user, and, upon approving the user, the authentication server is to identify one or more authorized destinations for a user, the one or more authorized destinations being directed to the elevator control. In some embodiments, the authentication server may provide the approval and one or more authorized destinations directly to the elevator control. In some embodiments, elevator control is then to call an elevator for the user to take the user to the one or more authorized destination.

In some embodiments, upon the called elevator arriving and the user entering the elevator, an elevator AP is to detect the mobile device of the user to confirm that the user has entered, and the elevator is to transport the user to the authorized destination. Exiting of the user from the elevator may then be detected by the elevator AP, and may further be detected by a second entrance AP at the destination location.

In some embodiments, an intelligent elevator control system is further to alter operation of one or more elevators in response to a safety or security condition. In some embodiments, an intelligent elevator control system provides one or more additional functions to enhance security, safety, and convenience in operation of the elevator system, as further described below.

As used herein, access point (AP) (also referred to as a wireless access point (WAP)) refers to a networking hardware device that allows devices to connect to a wired network. The AP may operate using BLE, Wi-Fi, or other wireless communication technology. The AP may connect to a router (via a wired network) as a standalone device, or may be an integral component of the router itself.

As used herein, mobile device (or wireless mobile device) includes a smart phone, smart watch, tablet, or other mobile electronic device that includes capability for wireless communication.

Figure 1A:
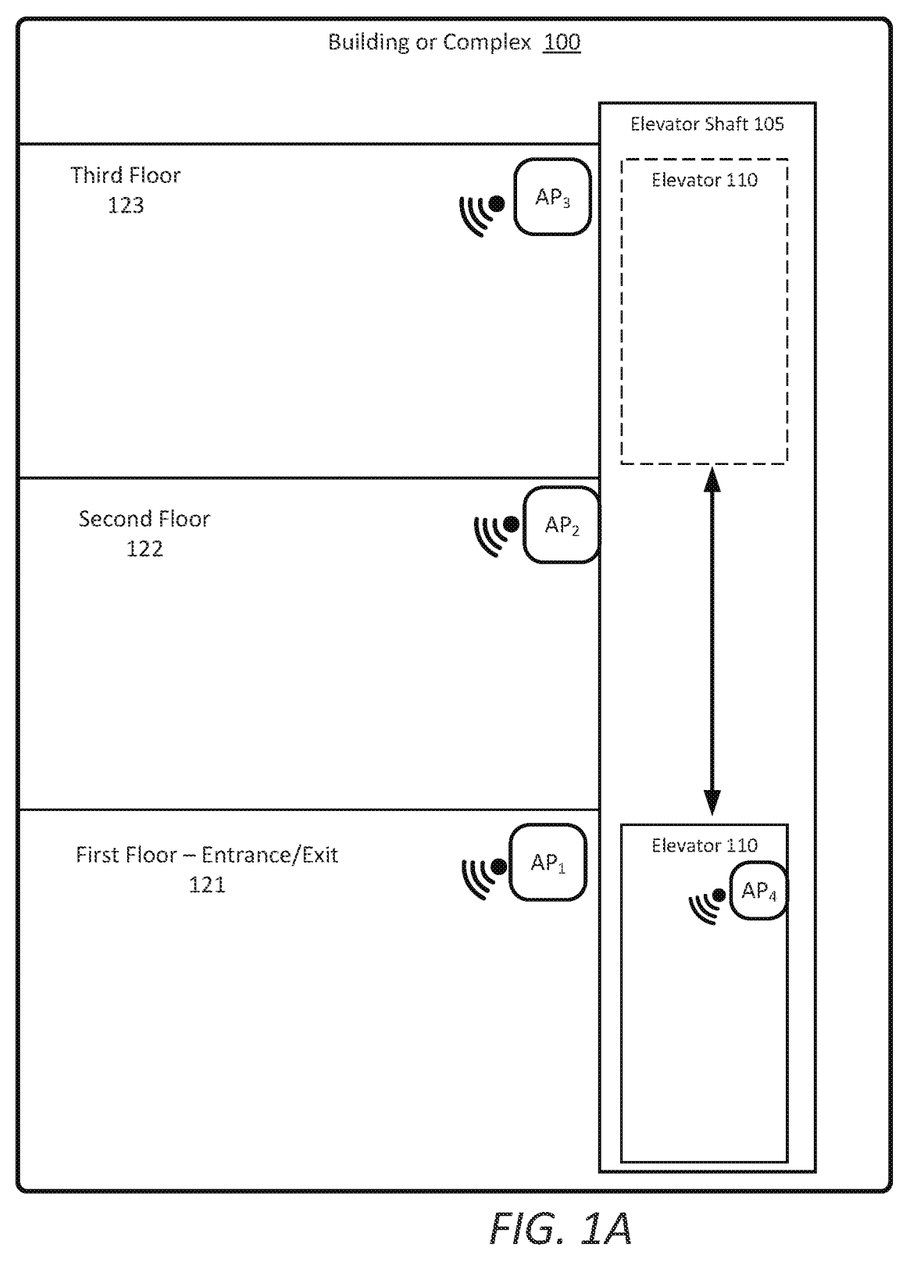
FIG. 1A is an illustration of a building or complex including an intelligent elevator control system, according to some embodiments.

FIG. 1A is an illustration of a building or complex including an intelligent elevator control system, according to some embodiments. A building or complex includes an elevator system, such as including one or more elevators 110 operating within one or more elevator shafts 105 to transport persons to multiple different floors, which in this illustration includes a first floor 121 that includes a building entrance or other entry to the elevator 110, a second floor 122, and a third floor 123.

In some embodiments, the building or complex 100 includes one or more entrance access points to detect mobile devices of users that are in a vicinity of the elevator 110 within the building or complex. In FIG. 1A the one or more entrance APs include $AP_1$ to detect users near the elevator 110 on the first floor 121, $AP_2$ to detect users near the elevator 110 on the second floor 122, and $AP_3$ to detect users near the elevator 110 on the third floor 123. (In some embodiments, a single entrance AP may be sufficient if, for example, persons entering the elevator at floors other than the entrance floor are only authorized to take the elevator to an exit for the building or complex.) In some embodiments, each elevator such as elevator 110 may further include an elevator AP, such as $AP_4$ in elevator 110, to detect the mobile devices of users to confirm when such users enter and exit the elevators. The access points may utilize BLE communications or another wireless communication protocol, such as Wi-Fi.

In some embodiments, the elevator system provides intelligent access control for users of the building or complex 100, using the entrance access points to detect approaching users and the elevator access points to detect individuals entering and exiting the elevators. In some embodiments, the elevator system is to provide elevator operation to transport authorized users only to authorized destinations.

Figure 1B:
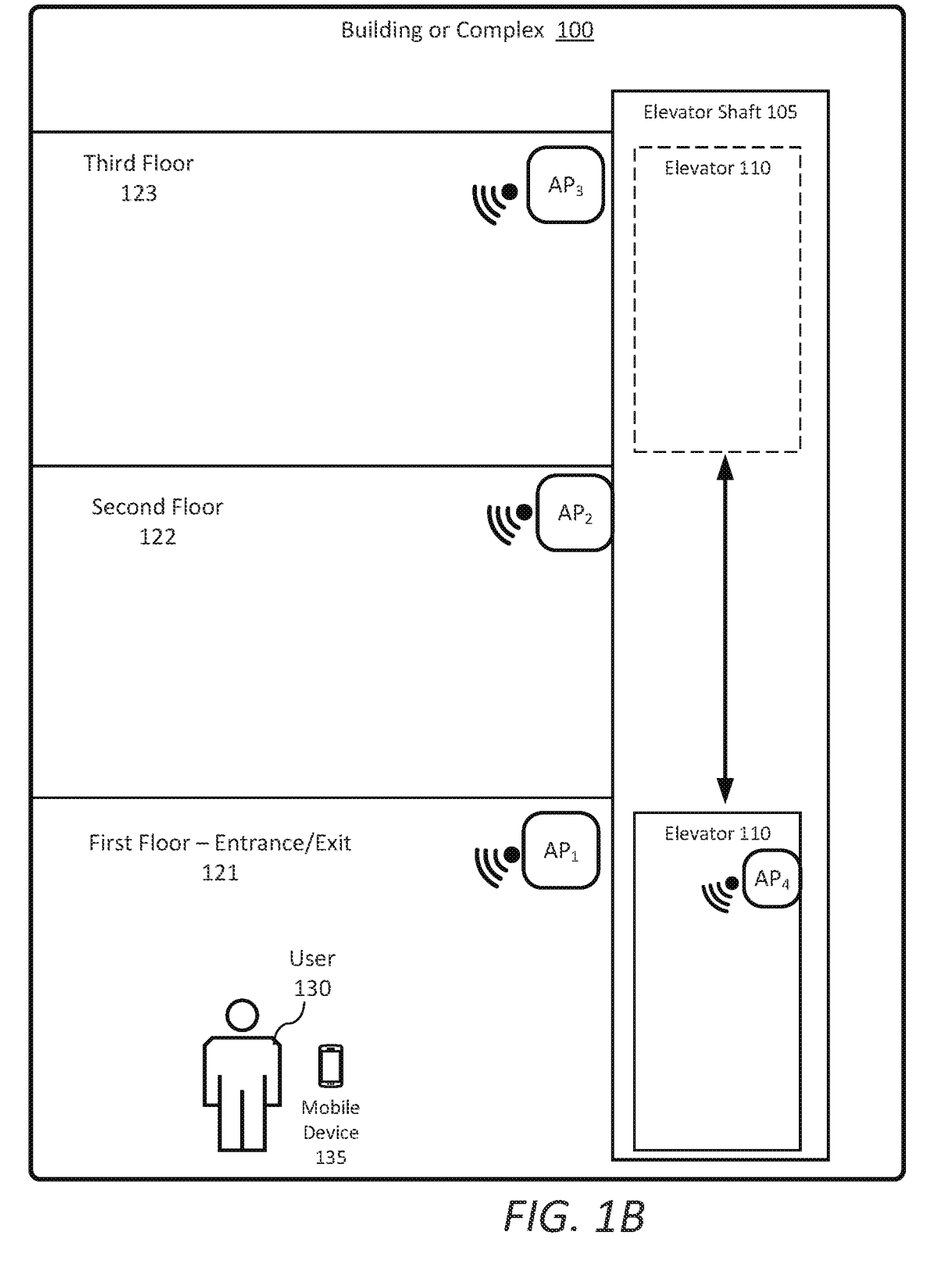
FIG. 1B is an illustration of operation of an intelligent elevator control system, according to some embodiments.

FIG. 1B is an illustration of operation of an intelligent elevator control system, according to some embodiments. As also illustrated in FIG. 1A, a building or complex 100 includes an elevator system, such as including one or more elevators 110 operating within one or more elevator shafts 105 to transport persons to multiple different floors, the floors being a first floor 121 that include a building entrance or other entry to the elevator 110, a second floor 122, and a third floor 123.

In a first example shown in FIG. 113, a user 130 including a mobile device 135 may be authorized to travel only to the third floor 123 of the building or complex 100. Upon the user 130 entering the building or complex 100 and approaching the elevator 110, the $AP_1$ is to detect the mobile device 135 and attempt to authenticate the user 130 for a destination utilizing the elevator 110. The authentication may include communication with an authentication server, such as illustrated in FIGS. 2 and 3.

Figure 2:
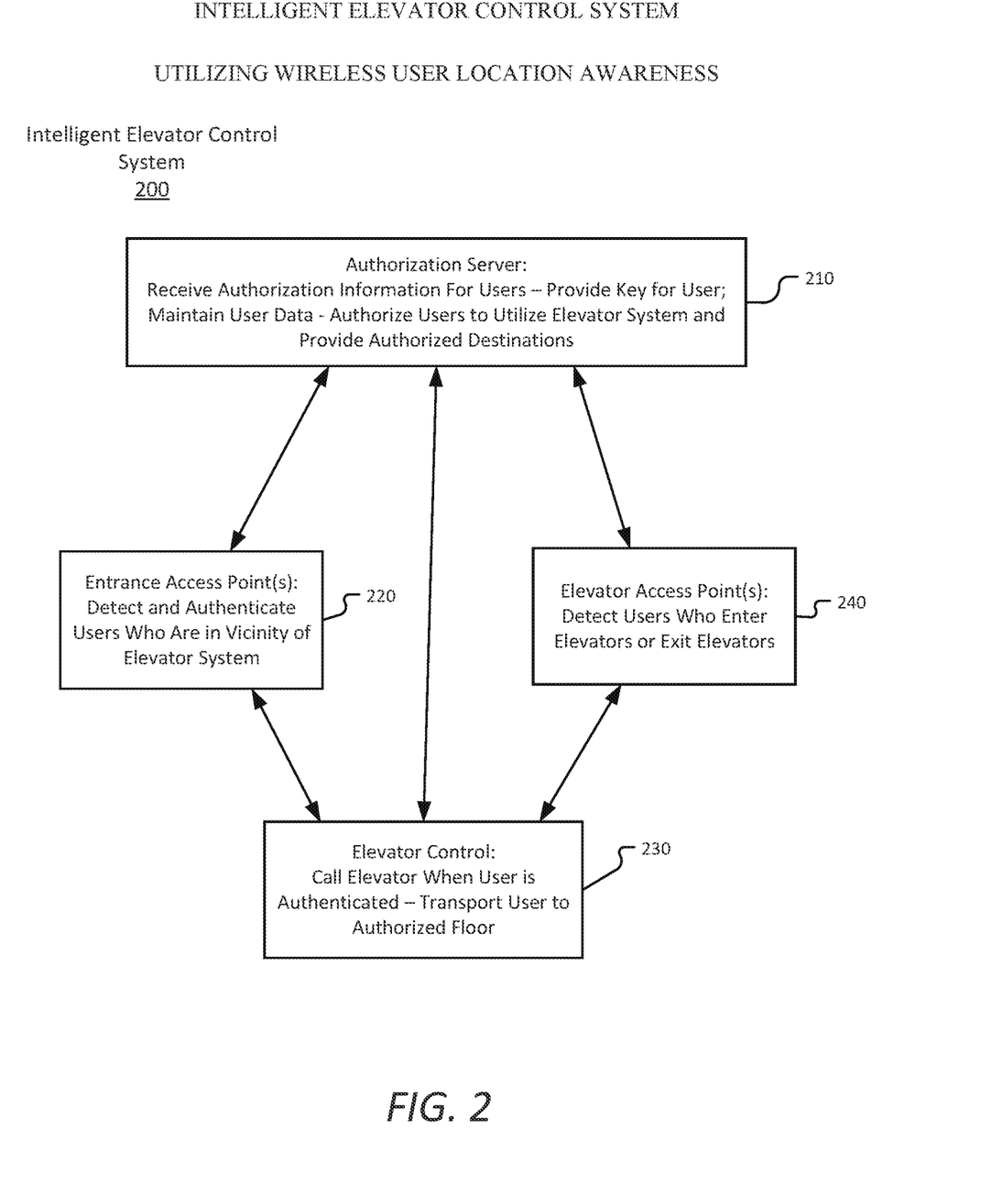
FIG. 2 is an illustration of components of intelligent elevator control system according to some embodiments. according to some embodiments.
Figure 3:
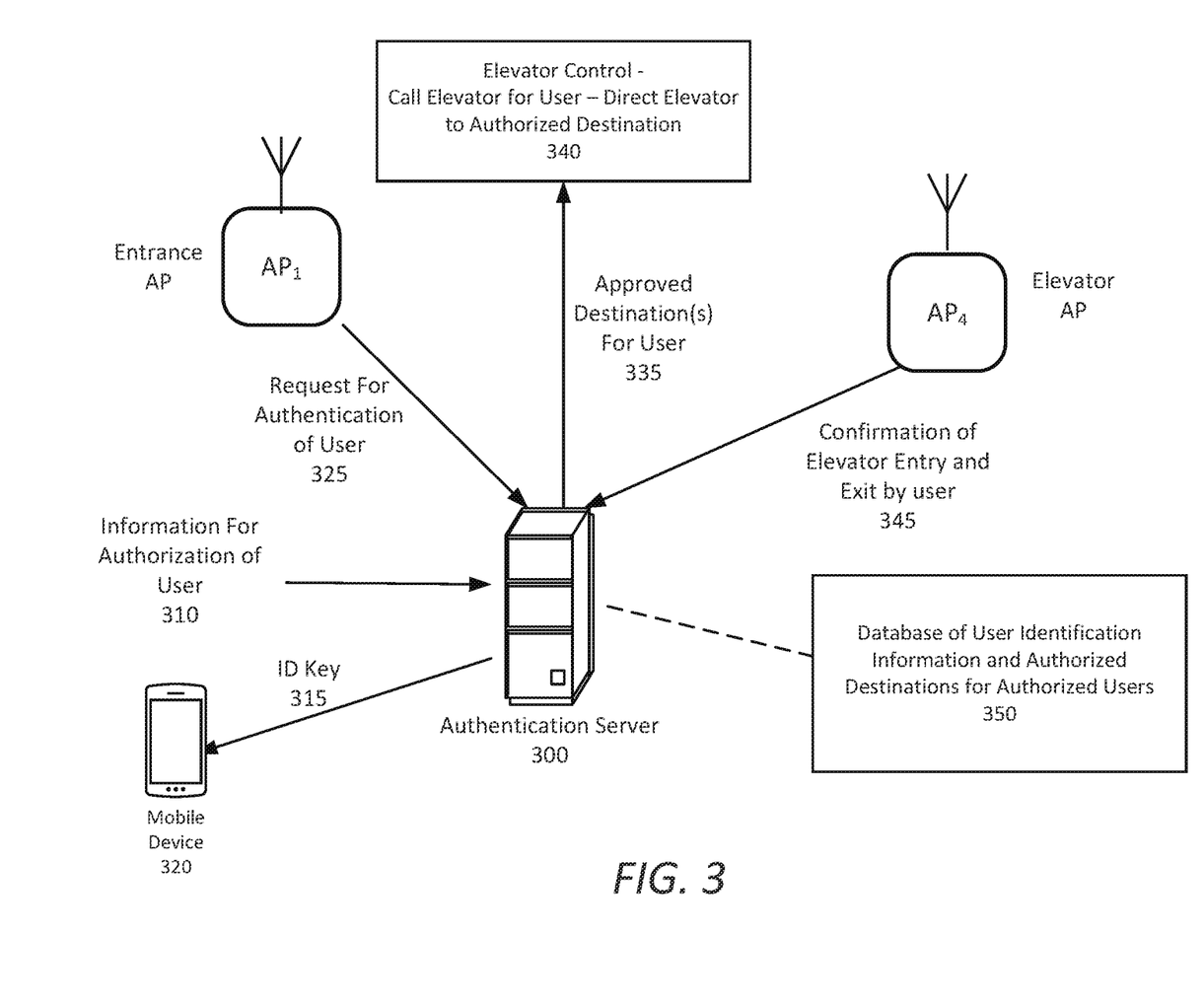
FIG. 3 illustrates operations of an authentication server in an intelligent elevator control system utilizing wireless user location awareness, according to some embodiments.

Upon the user being authenticated for a destination floor, an elevator control unit, such as illustrated in FIGS. 2 and 3, is to call the elevator 110 for the user. Upon the elevator 110 arriving and opening, the user 130 may enter the elevator. In some embodiments, the elevator $AP_4$ may then detect the mobile device 135 to confirm that the correct individual has entered the elevator 110. At such time, the elevator 110 may then close and transport the user 130 to the authorized destination, which in this instance is the third floor 123, which may be the only floor the user 130 is authorized to travel to from the first floor 121. In other instances, a user may have multiple floor access, and be allowed to select between authorized destinations.

Figure 1C:
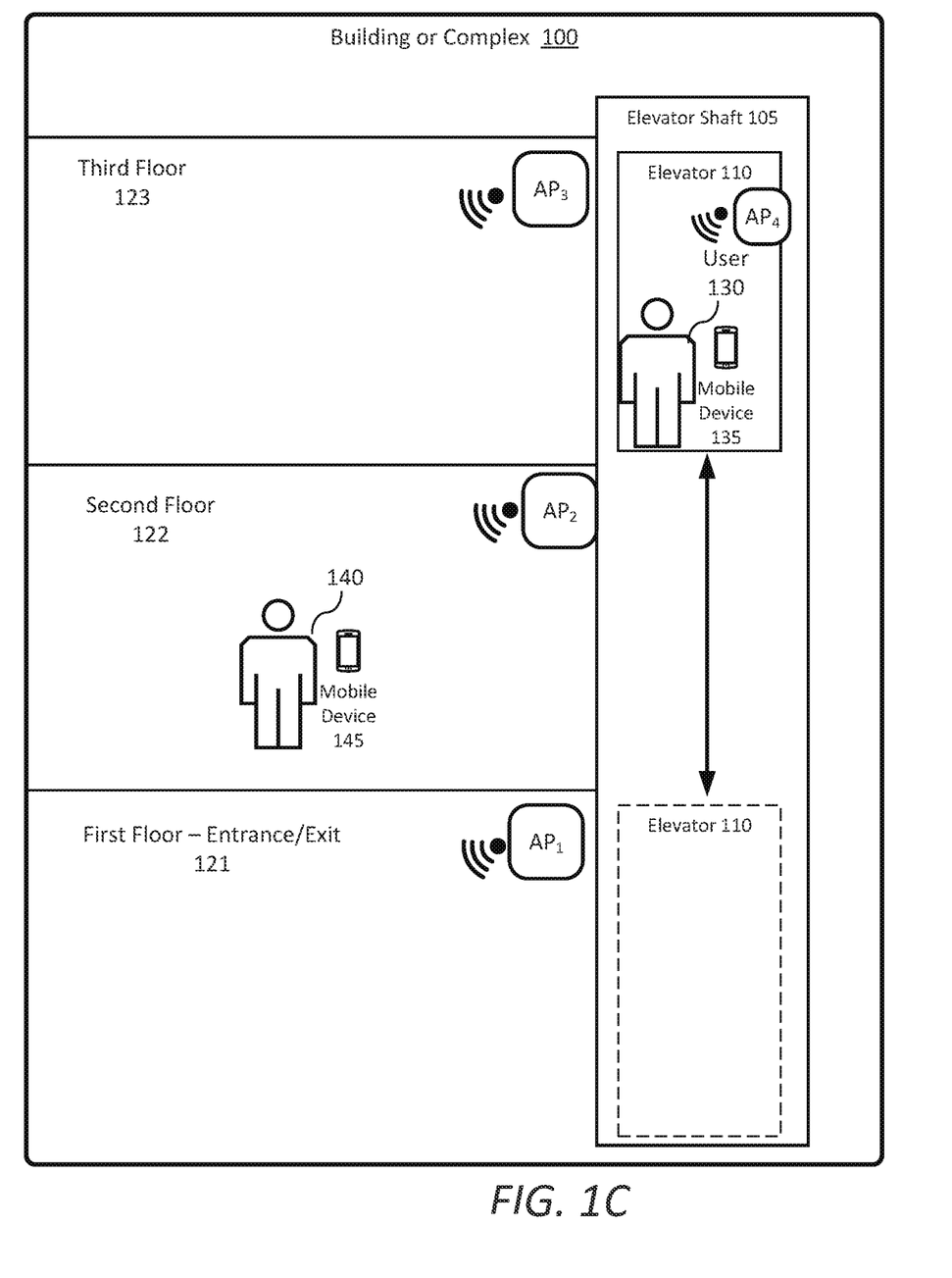
FIG. 1C is an illustration of operation of an intelligent elevator control system, according to some embodiments.

FIG. 1C is an illustration of operation of an intelligent elevator control system, according to some embodiments. Continuing the first example illustrated in FIG. 1B, upon reaching the third floor 123 the elevator 110 is to open, and the elevator $AP_4$ may then detect when the user 130 has exited the elevator 110. Upon the user exiting the elevator 110, entrance $AP_3$ may then confirm that user 130 has entered the third floor 123 though detection of mobile device 135. The system may further track the user's location and provide an alarm if there is any anomaly. In some embodiments, the elevator system may act to update an indoor tracking system for the building or complex regarding user entry and exit. In this manner, users being transported by the elevator system are also tracked by the indoor tracking system.

In a second example, a user 140 with mobile device 145 may be on the second floor 122, having completed the initial process of authentication to reach the second floor. The user 140 may now be ready to leave the building or complex 100, and approaches the elevator 110. In this instance, the entrance $AP_2$ for the second floor is to detect the mobile device 145, and attempt to authenticate the user 140. User 140 may now have a single authorized destination, this being the first floor 121 (or any other floor having an exit from the building or complex 100). The process may proceed with the elevator 110 being called to the second floor 122 for the user 140; elevator $AP_4$ to confirm that user 140 has boarded the elevator 110; the elevator 110 to transport the user to the first floor; elevator $AP_4$ is to confirm that user 130 has exited the elevator 110; and entrance $AP_1$ is to confirm that user 140 has reached the first floor 121.

In some embodiments, the intelligent elevator control system, such as illustrated in FIGS. 1A-1C, is further to alter operation of the elevator system in response to a safety or security condition. In some embodiments, the intelligent elevator control system may operate to provide additional functions to enhance security, safety, convenience, including, but not limited to, the following:

(a) The intelligent elevator control system may include a counting mechanism that counts the number of passengers that enter and exit the elevator. The intelligent elevator control system may then compare the number of passengers to the number of users who have been authenticated for elevator use to ensure that the correct number of passengers are present. A discrepancy in the number of passengers may result in pausing operation of the elevator, providing a warning, or providing an alarm, depending on the particular circumstances.

(b) In an operation an elevator may detect an overweight condition in which the total weight of the occupants of the elevator is above an allowed weight for elevator operation. In some embodiments, the intelligent elevator control system is to make an intelligent choice as to which occupant or occupants of the elevator should exit and wait for another elevator based on one or more factors. The one or more factors may include the authorized destination for each passenger to provide improved efficiency (e.g., if two passengers have a destination that is different than the rest of the passengers, these two passengers may be asked to wait for another elevator); or identification of passengers who should receive priority in a building or complex (e.g., guests may receive priority over staff at a hotel or resort; and certain personnel may receive priority in a medical facility when necessary).

(c) An elevator may stop operating because of a failure. In some embodiments, the intelligent elevator control system may, based on the persons who have been detected in the elevator, automatically send a list of persons who are stuck in the elevator to appropriate persons, such as system or office administrators, emergency response, family members, or others.

(d) In some embodiments, the intelligent elevator control system includes information regarding alarm conditions, such as fire or other emergency. The intelligent elevator control system thus may refuse to allow new access to the elevator to avoid elevator use during the emergency. Further, if an elevator is in operation when an alarm is received, the intelligent elevator control system may choose to take an appropriate action such as stopping at a next floor and instructing the passengers to exit the elevator.

(e) In some embodiments, the intelligent elevator control system may receive reports from users or building staff regarding problems with operation of one or more elevators. The system may forward the report data to the authentication server, and adjust elevator usage as appropriate, such as routing authenticated users to different elevators or different banks of elevators to avoid problem areas. If a high severity issue occurs, the intelligent elevator control system may act to refuse elevator usage, and provide a notice or announcement regarding elevator maintenance, thus avoiding the need to manually shut off elevator operation for a particular elevator or bank of elevators.

FIG. 2 is an illustration of components of an intelligent elevator control system according to some embodiments. In some embodiments, an intelligent elevator control system 200 for a building or complex includes:

(1) Authorization Server 210: The authorization server is to receive authorization information for users for the building or complex including authorized destinations in the building or complex for user, such as floors that each user is authorized to enter; provide a key for a mobile device of a user to allow identification of the user; maintain user data for each user, which may include deleting expired data for a user; and authorize users to utilize the elevator system of the building or complex, including providing authorized destinations (such as floors) for each user.

(2) Entrance Access Point(s) 220—The system 200 includes at least one entrance AP at each point that a user may enter the elevator system. In some embodiments, each floor of a building or complex may include an entrance AP. Each entrance AP (such as $AP_1$, $AP_2$, and $AP_3$ illustrated in FIGS. 1A-1C) is to detect mobile devices of users who are in the vicinity of the elevator system, and to request authentication of such users from the authentication server 210.

(3) Elevator Control 230—The elevator control is to control operation of one or more elevators based at least in part on data or instructions received from the authentication server, from access points, or both. Operations including calling an elevator when a user is authenticated, and transporting a user to an authorized floor in the building or complex.

(4) Elevator Access Point(s) 240—In some embodiments, each elevator of an elevator system may further include an elevator AP (such an $AP_4$ illustrated in FIGS. 1A-1C), the elevator AP to detect persons entering the elevator, and to confirm when any person exits the elevator. The elevator AP further be able to contact the authentication server for authentication of certain persons if required.

FIG. 3 illustrates operations of an authentication server in an intelligent elevator control system utilizing wireless user location awareness, according to some embodiments. In some embodiments, a authentication server 300 in an intelligent elevator control system, such as the intelligent elevator control system 200 illustrated in FIG. 2, is to provide authentication of users for user of an elevator system.

For example, the authentication server 300 is to receive information for authorization of a user to utilize the elevator system 310, wherein the information includes one or more authorized destinations for the user in the building or complex. The information may further include, for example, the dates and times for which the user has authorization. In some embodiments, the authentication server 300 is to provide an identification key 315 for the mobile device 320 (if required for secure detection and authentication of the mobile device), and maintain a database of user identification information and authorized destinations for authorized users 350.

In some embodiments, the authentication server 300 is further to utilize the information in the database 350 to support user authentication for the elevator system. In an example, the authentication server 300 may receive a request for authentication of a user 325 from an entrance AP designated as $AP_1$, such as $AP_1$ illustrated in FIGS. 1A-1C.

Upon approving authentication of the user, the authentication server 300 is to provide identification of one or more authorized destinations for the user 335 for use of an elevator control 340 (either directly or via one or more access point) to allow the elevator control 340 to call an elevator for the user, and direct the elevator to an authorized destination. In some embodiments, the authentication server 300 may further receive confirmation of a user entering or exiting an elevator 345 from an elevator AP designated as $AP_4$, such as $AP_1$ illustrated in FIGS. 1A-1C, to assist in confirming that users utilizing the elevator are authorized, and that such users are transported to authorized destinations.

Figure 4:
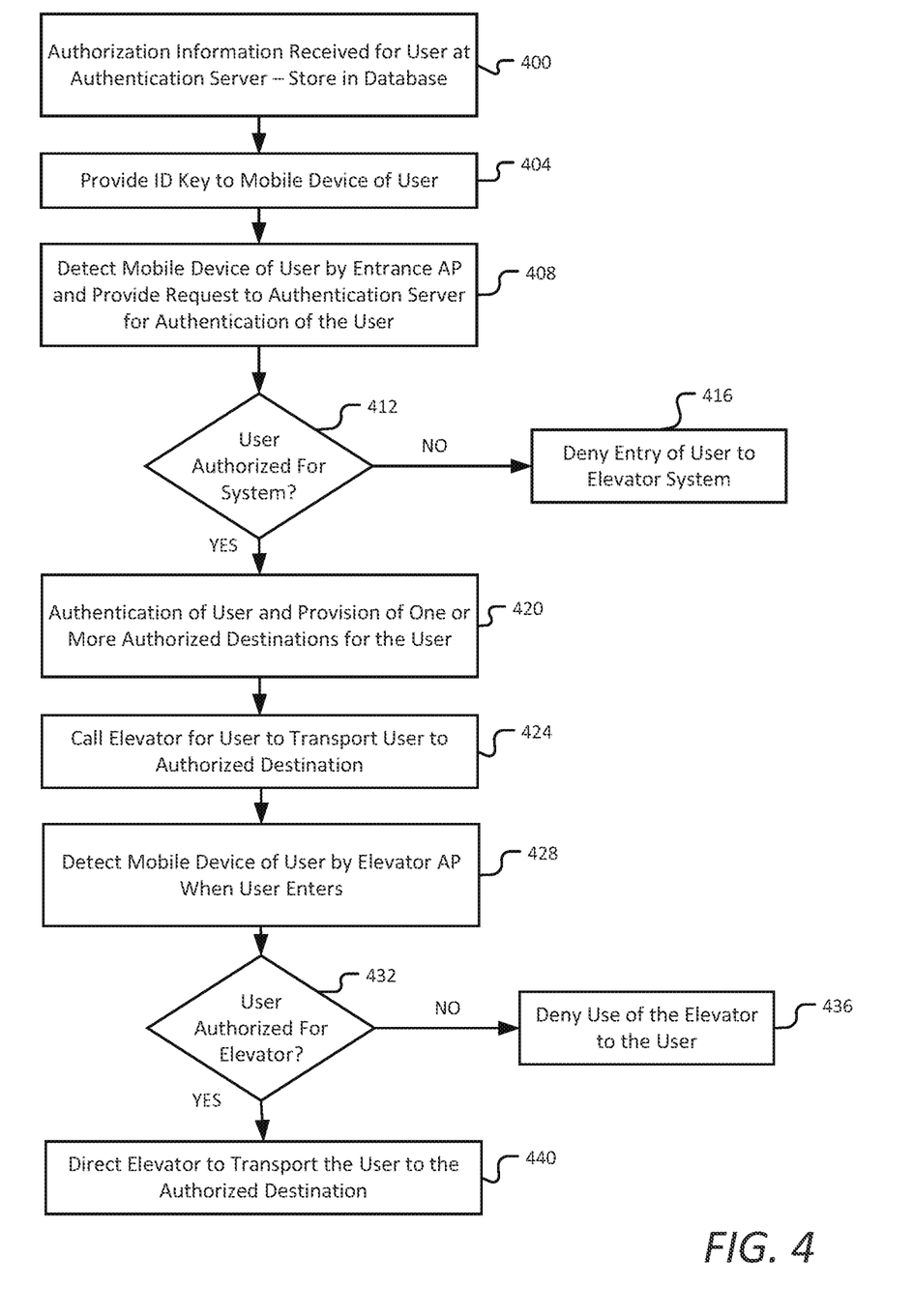
FIG. 4 is a flowchart to illustrate a process for intelligent operation of an elevator system utilizing wireless user location awareness.

FIG. 4 is a flowchart to illustrate a process for intelligent operation of an elevator system utilizing wireless user location awareness. In some embodiments, authorization information for an intelligent elevator control system for a building or complex is received for a user at an authentication server, which stores such information in a database 400. The information includes identification of the user and one or more authorized destinations for the user, such as one or more floors that the user is authorized to access in a building or facility. The information may further include times and dates for the authorization for the user, which may, for example, expire after a certain amount of time, depending on the type of access that a certain user has.

In some embodiments, the authentication server may provide an authentication key or other data for the mobile device of the user 404 to allow secure authentication of the user. The mobile device may then be utilized to identify a user for elevator, and to track the user as the elevator system is used.

In some embodiments, an entrance AP of the intelligent elevator control system, such as $AP_1$ illustrated in FIGS. 1A-1C, is to detect the mobile device of the user and request authentication of the user from an authentication server 408. The authentication server is to determine whether the user is authorized to utilize the elevator system 412. If the user is not authorized, the user is denied entry to the elevator system 416. Further, the system may provide other actions in response to the denial of entry, such as providing a visual or auditory notice to the user, or generating an alarm condition if needed.

If the user is confirmed as an authorized user, the authentication server is to provide authentication of the user and identification of one or more authorized destinations for the user 420, wherein the one or more authorized destinations may include one or more floors of the building or complex that the user is authorized to access. The authentication information and authorized destinations may be directed to an elevator control for the elevator system, and the elevator control system can then control one or more elevators to provide service to the authorized user.

In some embodiments, an elevator is called by the elevator control for the user to transport the user to an authorized destination 424. If the user has more than one authorized destination, the user may be allowed to select one of the authorized destinations as a current destination, either through an elevator control or through the mobile device of the user.

In some embodiments, upon the user entering the elevator, an elevator AP may detect the mobile device of the user 428 to ensure that the correct person enters the elevator. If a user entering the elevator is not authorized to the user 432, the user may be denied use of the elevator 436, i.e., the elevator may not move while the unauthorized person is present. Further, the elevator system may generate a warning or an alarm condition to address the anomaly. If the authorized user is confirmed as entering the elevator 432, the elevator control is to direct the elevator to transport the user to the authorized destination 440. Upon reaching the authorized destination, the elevator system may then confirm that the user has exited the elevator at an authorized destination. Further, the detection and authentication process may again proceed for the same user when the user attempts to leave the authorized destination using the elevator system.

Figure 5:
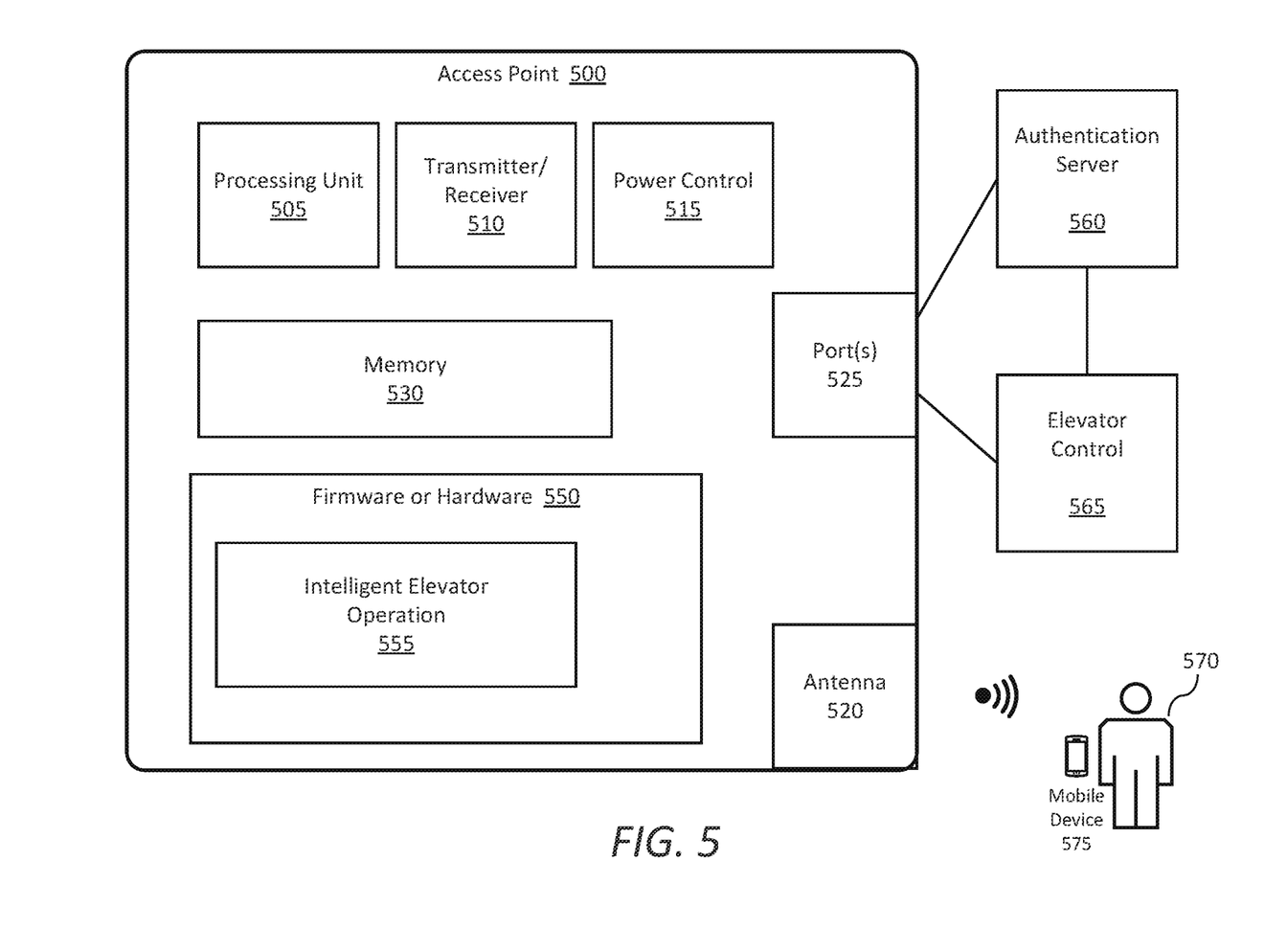
FIG. 5 is block diagram to illustrate an access point for an intelligent elevator control system according to some embodiments.

FIG. 5 is block diagram to illustrate an access point for an intelligent elevator control system according to some embodiments. An access point 500 includes additional components and elements not illustrated in FIG. 5, which is simplified for sake of illustration. The illustrated access point 500 may include an access point operating under BLE or another wireless protocol, such as one or more IEEE 802.11 standards for Wi-Fi operation. The access point 500 may include either an entrance access point 220 or an elevator access point 240 as illustrated in FIG. 2.

In some embodiments, the access point 500 includes a processing unit 505, a transmitter and receiver 510, power control 515, and one or more antennas 520 for wireless signal communication. The access point 500 may further include one or more ports 525 for network connections or other connections, and a memory 530 for storage of data, which may include volatile and nonvolatile memory (including flash memory and similar elements), registers, and other storage technologies.

In some embodiments, the access point 500 may further include firmware or hardware or both 550 to provide control intelligent elevator operation in an elevator system 555, such as illustrated in FIGS. 1A-4. In some embodiments, the access point 500 is coupled with a authentication server 560 for authentication of users for the intelligent elevator control system. In some embodiments, the access point 500 further includes a connection to an elevator control 565, such as further illustrated in FIG. 6, to control operation of one or more elevators in the intelligent elevator control system.

In some embodiments, the access point 500 is to detect mobile devices of users, such as mobile device 575 of user 570, and request authentication of the users for access to the intelligent elevator control system.

Figure 6:
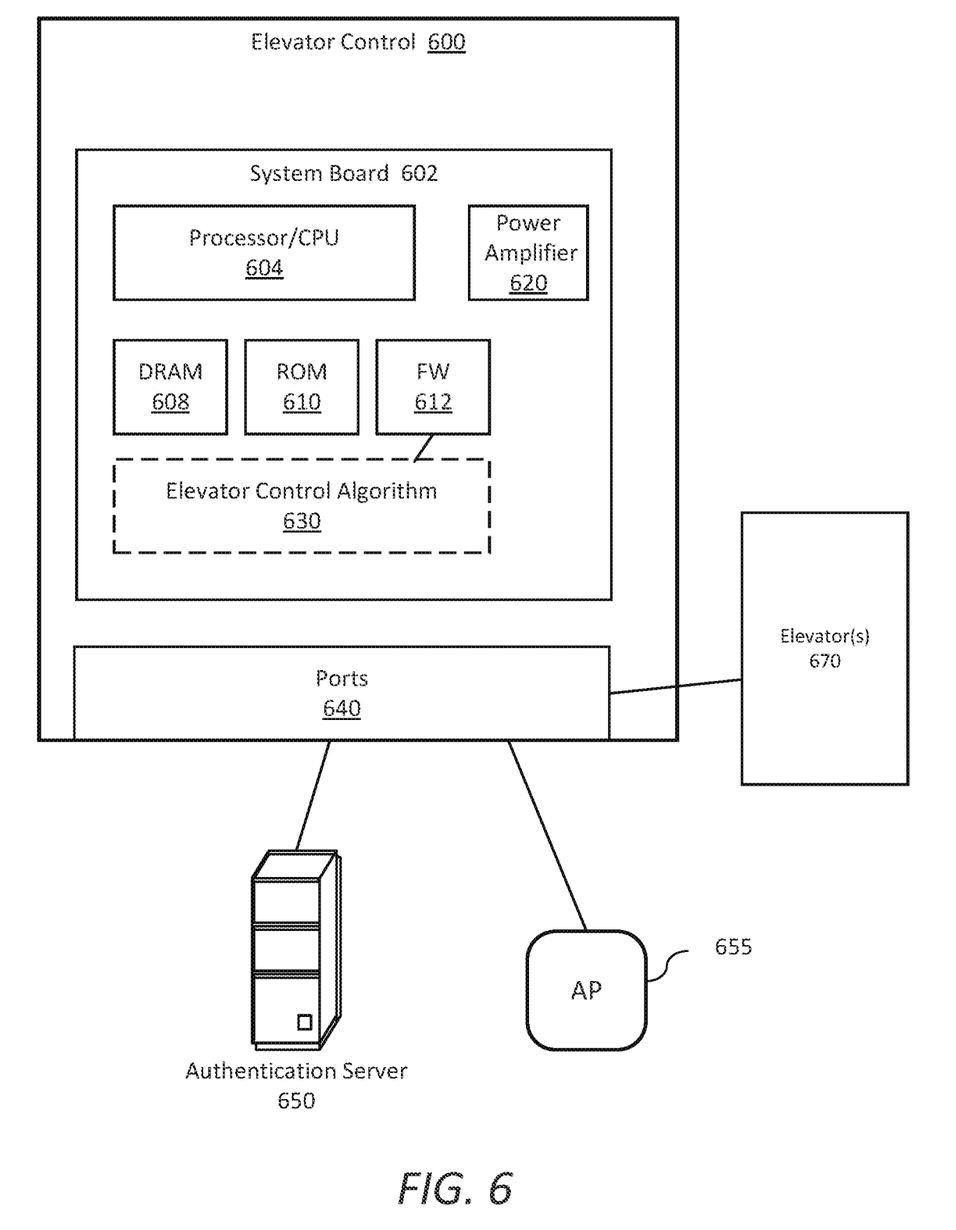
FIG. 6 illustrates components of an elevator control for an intelligent elevator control system, according to some embodiments.

FIG. 6 illustrates components of an elevator control for an intelligent elevator control system, according to some embodiments. In some embodiments, an elevator control 600 may include the elevator control 230 illustrated in FIG. 2 and may provide for control of one or more elevators 670 in an intelligent elevator control system, such as elevator 110 illustrated in FIGS. 1A-1C. The elevator control 600 provides for control for calling elevators, opening and closing doors of elevators, directing the elevators to particular floors, and any other needed controls of the elevators 670.

In some embodiments, the elevator control 600 includes one or more ports 640 for connection to an authentication server 650, one or more APs 655, or both in operation of the intelligent elevator control system. In some embodiments, the elevator control 600 includes implementation of an elevator control algorithm 630, which may be at least partially implemented in firmware (FW) 612, to provide for intelligent elevator operation, such as illustrated in FIGS. 1A-5.

The elevator control 600 may further include a system board 602, and the system board 602 may include a number of components, including but not limited to a processor 604, such as a central processing unit (CPU). Other components may include, but are not limited to, volatile memory (e.g., DRAM) 608, nonvolatile memory (e.g., ROM) 610, and a power amplifier 620. These components may be connected to the system board 602, mounted to the system board, or combined with any of the other components. Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a system includes a plurality of receivers, including a first receiver at a first location and a second receiver at a second location, each of the plurality of receivers including one or more receiver antennas to receive polarized radio signals; a transmitter located at a third location to transmit a plurality of polarized radio signals, the transmitter including antennas for transmission of a first signal at a first polarization direction and transmission of a second signal at a second, different polarization direction; and a processing system to receive channel state information from each of the plurality of receivers, and to track a plurality of individuals in a region utilizing the received channel state information, wherein the tracking of the plurality of individuals is based at least in part on analysis of a polarization parameter and a set of location parameters that are generated for each of plurality of reflection paths based on the channel state information for each of the plurality of receivers.

In some embodiments, one or more non-transitory computer-readable storage mediums have stored thereon executable computer program instructions that, when executed by one or more processors, cause the one or more processors to perform operations including receiving channel state information for received signals from each of a plurality of receivers, the plurality of receivers including a first receiver and a second receiver, the received signals being reflections of a first signal transmitted at a first polarization direction and a second signal transmitted at a second polarization direction; determining a polarization parameter and a set of location parameters for each of a plurality of reflection paths at each of the plurality of receivers; combining reflection paths across the plurality of receivers to identify reflections for a plurality of persons; and determining a location for each of the plurality of persons based at least in part on the set of location parameters for each of the plurality of reflection paths at each of the plurality of receivers.

In some embodiments, method for passive multi-person location tracking utilizing signal polarization includes transmitting polarized radio signals from a Wi-Fi transmitter at a first location, the polarized signals including a first signal transmitted with a horizontal polarization and a second signal transmitted with vertical polarization, the signals being transmitted in a tracking environment; receiving reflected signals from the tracking environment at a first receiver at a first location and a second receiver at a second location, each of the first and second receivers including one or more receiver antennas to receive polarized radio signals; receiving channel state information at a location tracking server from the first receiver and the second receiver; generating a polarization parameter and a set of location parameters based on the channel state information received from the first receiver and the second receiver: combining of reflection paths at first and second receivers that have a closest polarization parameter to identify a plurality of persons in the tracking environment; and determining a location of each of plurality of persons in the tracking environment using the set of location parameters In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:

detecting a mobile device of a user at a first wireless access point for an elevator system;
requesting authentication of the user, by the first wireless access point, for use of the elevator system from an authentication server;
upon receiving the authentication for the user from the authentication server at the first wireless access point, the authentication including identification of a first authorized destination for the user, calling, by an elevator control, a first elevator for the user;
detecting the mobile device in the first elevator by a second access point; and
confirming entry of the user into the first elevator based on the detection of the mobile device by the second access point; and
directing the first elevator to the first authorized destination after confirming the entry of the user into the first elevator.

2. The one or more non-transitory computer-readable storage mediums of claim 1, further comprising the executable computer program instructions that, when executed by the one or more processors, cause the one or more processors to perform operations comprising:
receiving authorization information for the user at the authentication server, the authorization information including one or more authorized destinations for the user; and
storing the authorization information in a database.

3. The one or more non-transitory computer-readable storage mediums of claim 2, wherein the one or more authorized destinations include one or more floors of a plurality of floors served by the elevator system.

4. The one or more non-transitory computer-readable storage mediums of claim 1, wherein the detecting the mobile device of the user includes detecting an identification key of the mobile device.

5. The one or more non-transitory computer-readable storage mediums of claim 1, further comprising executable computer program instructions that, when executed by the one or more processors, cause the one or more processors to perform operations comprising:
detecting by the second access point that the mobile device is no longer in the first elevator; and
confirming exit of the user from the elevator based on the detection that the mobile device is no longer in the first elevator.

6. The one or more non-transitory computer-readable storage mediums of claim 1, further comprising the executable computer program instructions that, when executed by the one or more processors, cause the one or more processors to perform operations comprising:
upon receiving a rejection of authentication of the user from the authentication server, denying entry of the user to the elevator system.

7. The one or more non-transitory computer-readable storage mediums of claim 1, further comprising the executable computer program instructions that, when executed by the one or more processors, cause the one or more processors to perform operations comprising:
altering operation of the elevator system in response to a safety or security condition.

8. A system comprising:
an authentication server to authenticate users of one or more elevators, the authentication server to maintain a database of authorization information for the users, the authorization information including authorized destinations for each user of the users;
a first access point for the system, the first access point configured to detect users who are in a vicinity of the one or more elevators;
an elevator control for the one or more elevators, the elevator control configured to control operation of the one or more elevators based at least in part on authentication information from the authentication sever, wherein:
upon the first access point detecting a mobile device of a first user, the first access point is configured to request authentication of the first user for use of the one or more elevators from the authentication server,
upon determining that the first user is authorized to use the one or more elevators, the authentication server is configured to provide an authentication for the first user to the first access point, including identification of a first authorized destination for the first user, and
upon receiving the authentication of the first user at the first access point, the elevator control is configured to call a first elevator of the one or more elevators to transport the first user to the first authorized destination;
detecting the mobile device in the first elevator by a second access point;
confirming entry of the first user into the first elevator based on the detection of the mobile device by the second access point; and
directing the first elevator to the first authorized destination after confirming the entry of the user into the first elevator.

9. The system of claim 8, wherein the authentication server is to receive the authorization information for the users, the authorization information for the first user including one or more authorized destinations for the first user, and wherein the authentication server is to store the authorization information in the database.

10. The system of claim 8, wherein the first access point detecting the mobile device of the first user includes the first access point detecting an identification key of the mobile device.

11. The system of claim 8, wherein the elevator control is to alter operation of the one or more elevators in response to a safety or security condition.

12. The system of claim 8, wherein the first access point is to detect the mobile device of the first user utilizing Bluetooth Low Energy (BLE).

13. A method comprising:
receiving authorization information for one or more users at an authentication server, the authorization information including one or more authorized destinations for each user of the one or more users for an elevator system;
storing the authorization information in a database;
receiving a request for authentication of a first user for use of the elevator system from an access point, the request being based on detection of a mobile device of the first user of the one or more users by the access point;
determining whether the first user is authorized to use the elevator system based on the database;
upon determining that the first user is authorized to use the elevator system, transmitting an authentication for the user to the access point, the authentication including identification of one or more authorized destinations for the first user;
upon receiving the authentication of the first user at the first access point, an elevator control calling a first elevator of the one or more elevators to transport the first user to the first authorized destination;

detecting the mobile device in the first elevator by a second access point;

confirming entry of the first user into the first elevator based on the detection of the mobile device by the second access point; and directing the first elevator to the first authorized destination after confirming the entry of the user into the first elevator.

14. The method of claim 13, wherein the one or more authorized destinations includes one or more floors of a plurality of floors served by the elevator system.

15. The method of claim 13, wherein the detection of the mobile device of the first user includes detecting an identification key of the mobile device.

16. The method of claim 15, further comprising issuing the identification key to the first user for the mobile device upon receiving authorization information for the first user.

17. The method of claim 13, further comprising:
upon determining that the first user is not authorized to utilize the elevator system, transmitting a denial of authentication to deny entry of the first user to the elevator system.

18. The method of claim 13, further comprising:
receiving notice of a safety or security concern for the elevator system; and
transmitting a command to alter operation of the elevator system in response to the safety or security condition.

* * * * *